United States Patent [19]
Limberis et al.

[11] Patent Number: 5,852,729
[45] Date of Patent: Dec. 22, 1998

[54] CODE SEGMENT REPLACEMENT APPARATUS AND REAL TIME SIGNAL PROCESSOR USING SAME

[75] Inventors: Alexander John Limberis, San Jose; Joanne F. Ottney, Los Altos; Joseph Watson Bryan, Sunnyvale, all of Calif.

[73] Assignee: Korg, Inc., Tokyo, Japan

[21] Appl. No.: 84,801

[22] Filed: Jun. 29, 1993

[51] Int. Cl.[6] .................................................. G06F 9/00
[52] U.S. Cl. ...................... 395/566; 395/733; 711/152; 704/258
[58] Field of Search ............................ 364/964.3, 964.5, 364/964.6; 381/29; 84/602, 601, 645; 395/566, 733; 711/152; 704/258

[56] References Cited

U.S. PATENT DOCUMENTS

| | | | |
|---|---|---|---|
| 4,654,817 | 3/1987 | Dube et al. | 395/384 |
| 4,991,217 | 2/1991 | Garrett et al. | 704/235 |
| 5,109,504 | 4/1992 | Littleton | 395/500 |
| 5,142,481 | 8/1992 | Cox | 364/470.04 |
| 5,165,091 | 11/1992 | Lape et al. | 370/216 |
| 5,201,054 | 4/1993 | Dudhela | 395/200.6 |
| 5,261,072 | 11/1993 | Siegel | 395/842 |

OTHER PUBLICATIONS

Software Development and Real–time Target Systems on a Common Back Plane, Gold et al. IEEE publication 1991. pp. 69–73.

Design and Evaluation of an Architecture for a Digital Signal Processor for Instrumentation Application, by Ronald et al. IEEE publication pp. 537–544.

Primary Examiner—Zarni Maung
Attorney, Agent, or Firm—Mark A. Haynes; Wilson, Sonsini, Goodrich & Rosati

[57] ABSTRACT

A sequence of instructions for a processor executing a plurality of real time programs is supplied from a memory having a set of memory locations. A controller is coupled to the memory for replacing a program with a replacement program. The controller disables writes in response to instructions in the sequence from a particular group of memory locations with idle or no-operation instructions in response to a command. A memory interface is coupled to the memory and to the controller through which new instructions for the replacement program are written to the particular group of locations. The technique is applied especially for audio signal processors with a need for dynamic replacement of active voice programs.

39 Claims, 6 Drawing Sheets

CODE SEGMENT REPLACEMENT APPARATUS AND REAL TIME SIGNAL PROCESSOR USING SAME

CROSS-REFERENCE TO RELATED APPLICATION

The present application relates to U.S. patent application entitled OPEN ARCHITECTURE MUSIC SYNTHESIZER WITH DYNAMIC VOICE ALLOCATION, Ser. No. 08/016,865, filed Feb. 10, 1993, invented by Limberis, et al., which was owned by the same assignee. Applicant claims the benefit of such related application under 35 U.S.C. §120, to the extent the present invention is described therein.

BACKGROUND OF THE INVENTION

1. Field of the Invention

The present invention relates to real time processing systems; and more particularly, to a system of loading new programs to an instruction memory of a real time processor without interrupting the flow of other programs currently being executed.

2. Description of Related Art

Music synthesizers are used to synthesize a wide variety of musical sounds. It is desirable in such systems to provide users with many available sounds and with the ability to change the sounds being generated in real time without perceptible delays.

There are a number of music synthesizer architectures in common use. These include subtractive synthesis, wave table synthesis, F/M synthesis, and additive synthesis. A brief discussion of these common synthesis formats is provided in Walker, *Korg Wavestation,* Peter L. Alexander Publishing Inc., Newbury Park, Calif., 1990, pages 9 through 22. All of these four common synthesis types rely on playing back packaged waveforms, which may be manipulated in real time by the user to generate voices of the synthesizer. The packaged waveforms may consist of simple sine waves, as in the subtractive and FM synthesis formats, or of tables of actual recorded music from real instruments. The tables are typically stored in a compressed format known as Pulse Code Modulation (PCM) on memory chips in the synthesizer circuitry.

The prior art synthesizers based on playback techniques have somewhat limited range of voices that may be created by the instrument. To change the voices available on a given instrument, new sampling hardware must be added, in the form of new PCM tables, or the like.

There is a growing trend in the music synthesizer industry to synthesize sounds using sound generating programs executed by digital signal processors (DSPs). Since programming can be conducted by individual programmers who may not have access to the hardware resources necessary to update a sampling based synthesizer, users of the DSP synthesizers have much greater flexibility in the voices that may be played by their instrument.

These sound generating programs, called voice programs, are based on computational models of musical instruments, the human voice or other sound source. Thus, the developer of a sound generating program typically first defines a computational model of the sound source he or she desires to create, and then writes a computer program to execute the model. Prior art examples of such sound generating programs are described in U.S. Pat. No. 4,984,276, invented by Julius O. Smith, entitled "DIGITAL SIGNAL PROCESSING USING WAVEGUIDE NETWORKS."

Real time execution of programs stored in the music synthesizer implies the ability to select a voice program from the music synthesizer and execute the voice program without perceptible interruption in the output of the music synthesizer. This means that it is desirable for a music synthesizer to be able to load and execute all available voice programs without delay.

In the prior art, all the real time voices have to be preloaded in the digital signal processor instruction space. If a voice that was not preloaded needed to be played in real time, an audible interruption of the executing program would occur so that the time consuming process of clearing delay lines, updating tables, initializing coefficients, and supplying the program itself could be carried out. Further, this process was required to displace a voice program already loaded in the instruction space of the DSP, which could cause further audible interruptions or clicks in the output of the machine.

Therefore, prior art DSP based systems have been unable to provide for real time replacement of voice programs creating the voices of the synthesizer.

Accordingly, there is a need to provide real time execution of programs not preloaded in digital signal processing based music synthesizer systems and in other real time signal processing environments.

SUMMARY OF THE INVENTION

The present invention provides for dynamic replacement of executing programs suited for real time signal processing systems, such as music synthesizers or other audio signal processors. According to the present invention, an apparatus for replacing a segment of instructions for a processor comprises a memory having a set of memory locations and supplying a sequence of instructions from the set of memory locations. A controller is coupled to the memory that disables writes by the processor in response to instructions, or otherwise overrides execution of instructions, from a particular subset of the set of memory locations in response to an override command which identifies the particular subset. A memory interface is coupled to the memory and to the controller through which new instructions to replace instructions in the particular subset are written. The signal processor continues to execute all instructions in active programs in the memory without interruption thereby, maintaining proper relationships among active programs in the memory such as the timing of events generated by the programs, interrelationships between the programs, and real time coupling of the programs to external stimulus.

As mentioned above, the override command may include an identifier to identify the particular subset of the set of memory locations to be replaced. The identifier, in one aspect of the invention, includes a start address of the particular subset in the memory and a count value designating a length of the particular subset in the memory. The input to the controller includes a start register to hold the start address, and a count register to hold the count value.

The processor, according to another aspect of the invention, includes a sequencer coupled to the memory to supply a sequence of addresses to instructions in the memory, and the controller includes override logic coupled to the sequencer, the start register, and the count register operative to disable instructions in the sequence from the particular subset of memory locations. The override logic includes a counter coupled to the clock generator to count instruction cycles beginning with an instruction cycle during which the start address is asserted. The sequencer includes logic responsive to instruction cycles to supply addresses to the memory, and the counter includes count logic which issues a no-operation (NOP) flag until the instruction cycles counted equals the count value. The override logic includes circuitry responsive to the NOP flag to disable writes and reads by instructions in the sequence corresponding to the instructions in the particular subset of the memory with NOP instructions.

The memory interface includes a wait state generator for management of host access to memory and internal registers managed by the processor. By disabling both reads in addition to writes by the instructions being replaced, the host has freer access to such registers and memory, uninhibited by competition for data paths in the processor from the disabled instructions.

The invention can also be characterized as a signal processing system comprising a real time processor to execute a plurality of real time programs. An instruction memory is coupled to the real time processor to hold the plurality of real time programs and provide a sequence of instructions to the real time processor. A sequencer is coupled to the instruction memory and is operative to provide addresses corresponding to the sequence of instructions from the instruction memory. A controller is coupled to the instruction memory and is operative to override instructions from a particular group of addresses in response to a command. A host interface is coupled to the instruction memory and the controller through which new instructions are loaded to the instruction memory to replace a segment of instructions from the particular group of addresses.

According to another aspect of the invention, the real time signal processor comprises an audio processor. A host processor module is coupled to the audio processor and includes a host memory to store additional audio programs and is operative to overwrite the particular subset of the set of memory locations in the memory with an audio program from the host memory in real time without audible interruption in the output of the audio processor.

The present invention is particularly suited for a digital signal processing based synthesizer/audio processing system having the unique capability of being able to reconfigure itself extremely quickly in order to generate musical signals in response to real time control information from a keyboard, modulation controllers, standard MIDI inputs, etc. The system enables real time execution of voice programs in a digital signal processing based electronic music synthesizer, between voices requiring differing digital signal processing algorithms for execution.

Other aspects and advantages of the present invention can be seen upon review of the figures, the detailed description and the claims which follow.

DETAILED DESCRIPTION

Figure 1:
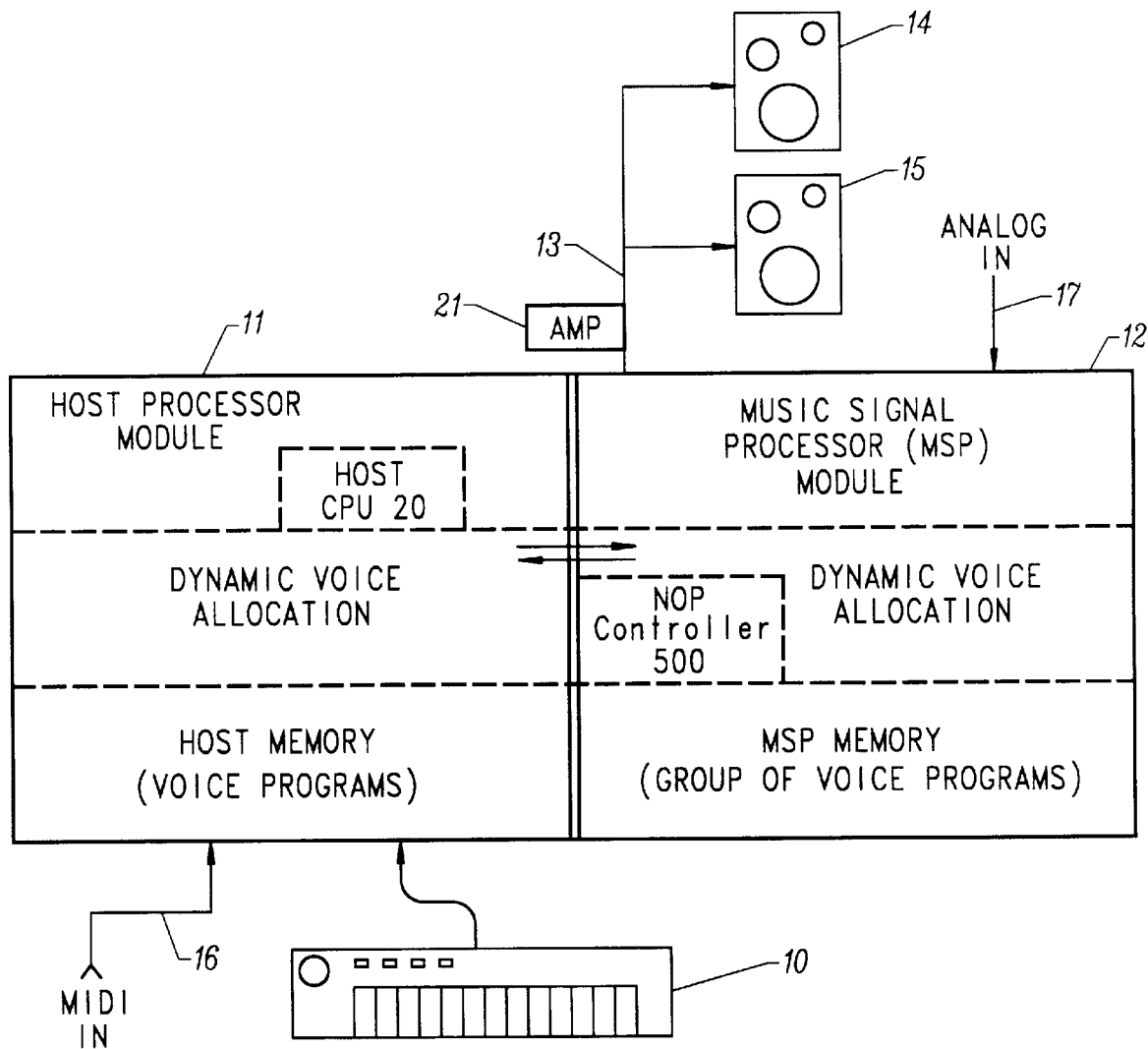
FIG. 1 is a conceptual block diagram of a music synthesizer according to the present invention.
Figure 2:
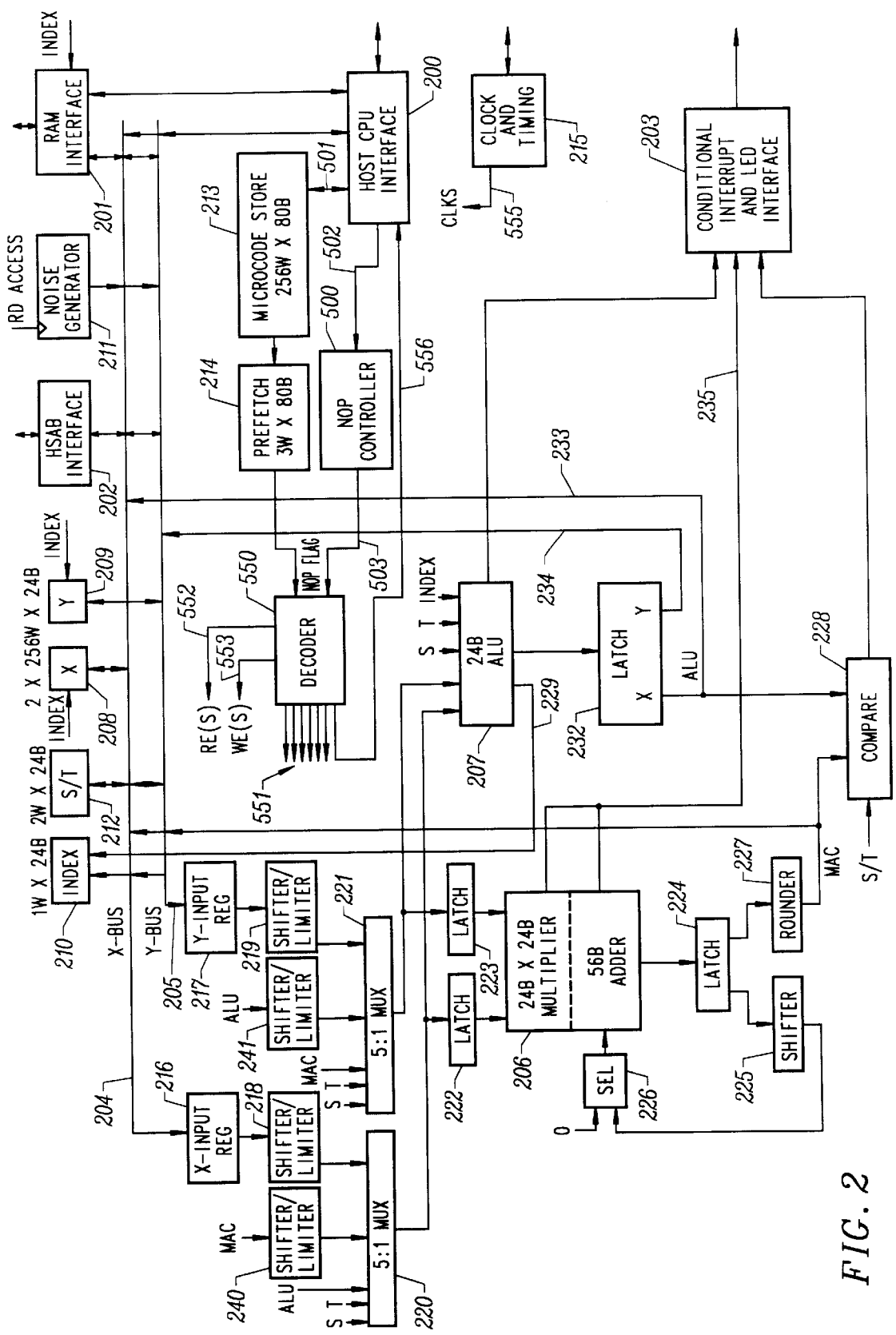
FIG. 2 is a functional block diagram of an integrated circuit music signal processor implementing a NOP controller according to the present invention.
Figure 3:
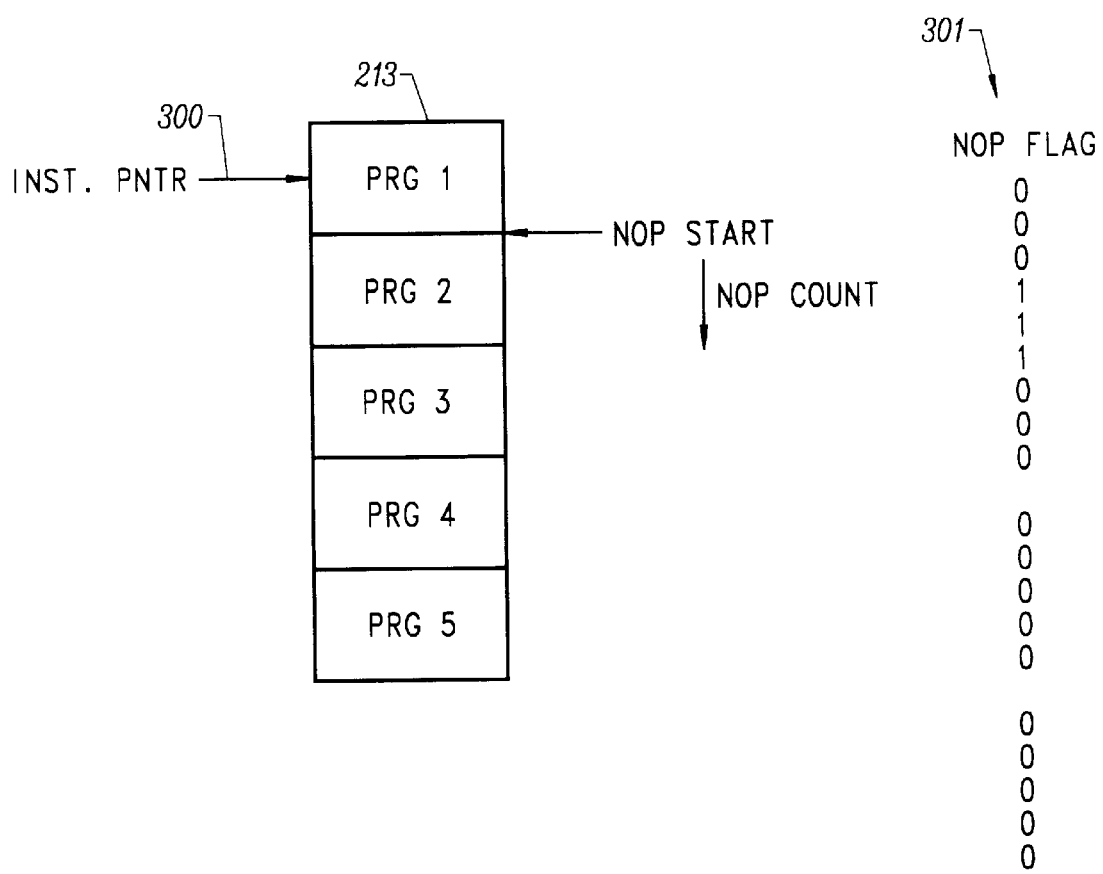
FIG. 3 is a chart of the microcode store and the NOP condition flag for the processor of FIG. 2.
Figure 4:
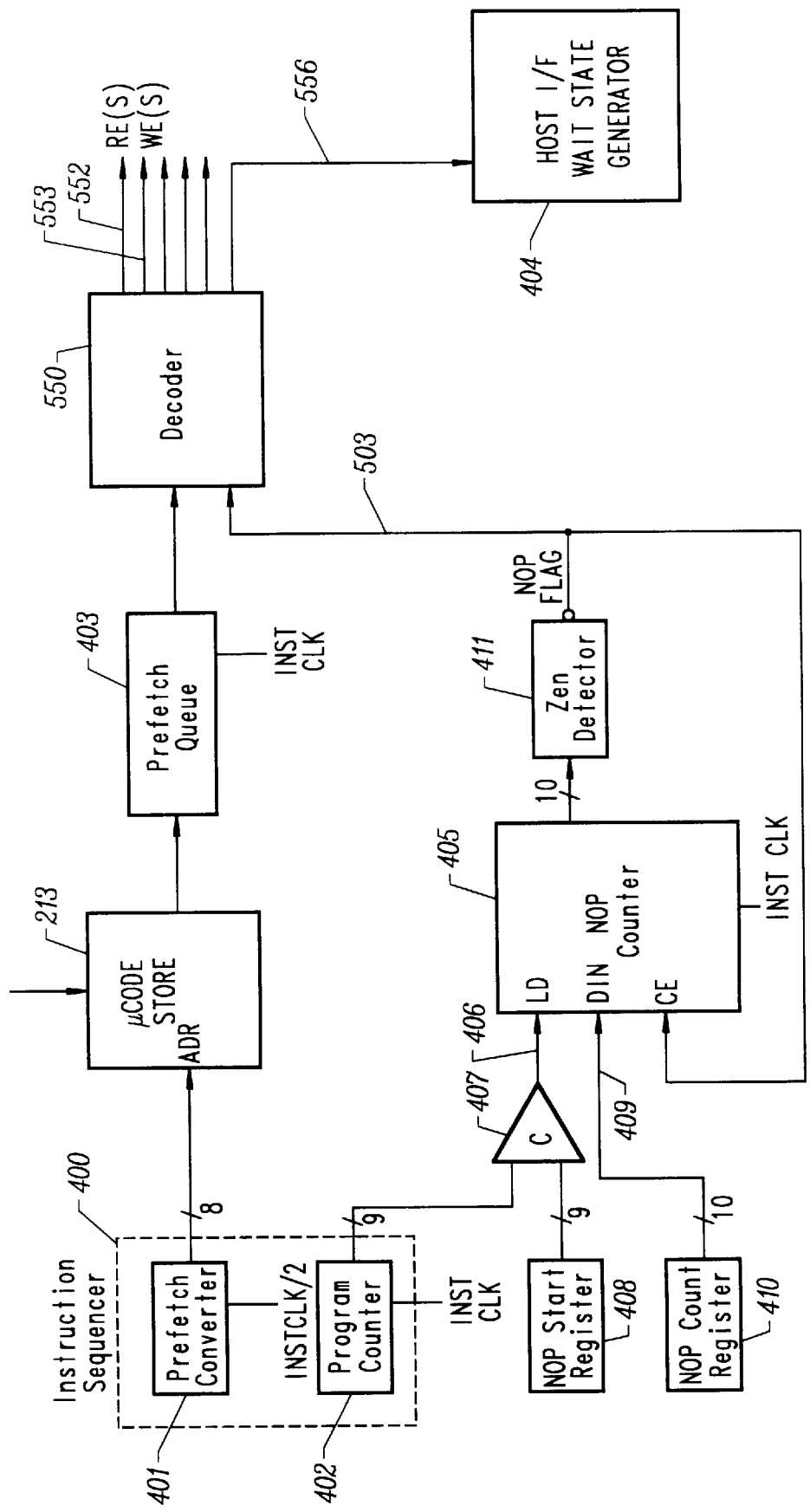
FIG. 4 is a logic diagram of the NOP controller in the processor of FIG. 2.
Figure 5:
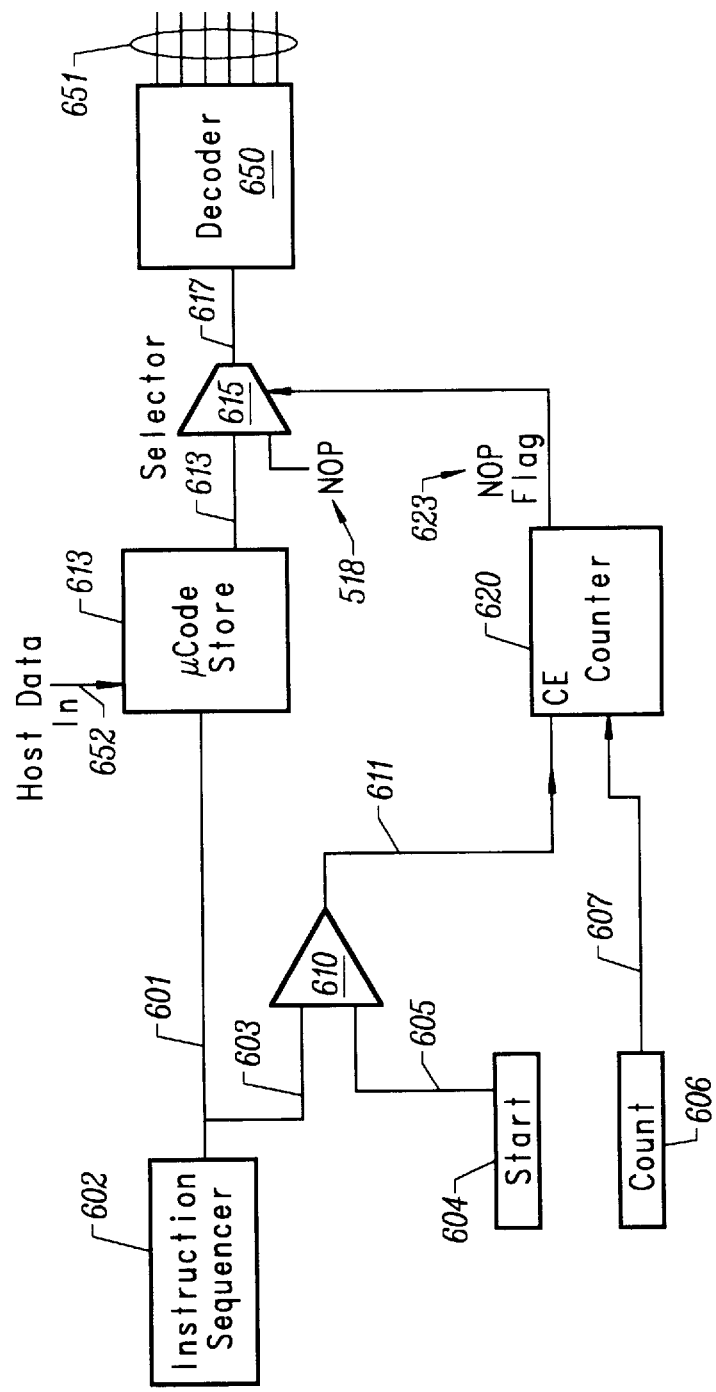
FIG. 5 is a logic diagram of an alternative NOP controller according to the present invention.

A detailed description of the preferred embodiments of the present invention is provided with respect to the Figs. FIG. 1 provides a heuristic overview of a music synthesizer using the present invention. FIG. 2 shows an integrated circuit processor incorporating the present invention. FIGS. 3 and 4 illustrate a specific implementation of a NOP controller. FIG. 5 illustrates an alternative approach to overriding instructions according to the present invention.

FIG. 1 provides an overview block diagram of a music synthesizer with dynamic allocation of voice programs, representative of a real time signal processing system according to the present invention. The invention may also be applied to other audio signal processors, like mixers or effects processors and to signal processing systems in general. The synthesizer includes an input device 10, a host processor module 11 including host CPU 20, host memory and dynamic voice allocation resources, and a music signal processor (MSP) module 12 including NOP controller 500, MSP memory and dynamic voice allocation resources. The music signal processor 12 generates an analog output on line 13 which is supplied through amplifier 21 to speakers 14 and 15 to generate real time sound. Besides analog sound signals, other audio signal types, such as digital sound data, in standard or non-standard formats may be used as well. The input device 10 may be a music keyboard or other device as known in the art. Other input signals may be supplied from a variety of sources, such as the MIDI standard format for musical instruments on line 16. The system also provides for accepting analog input signals on line 17, and for digitizing and supplying such signals to the music signal processor module 12.

The host processor module 11 provides a plurality of voice programs stored in the host memory. Also, the host processor module 11 accepts input signals from the input device 10 or from the input channel 16 for controlling allocation and production of voices in the music signal processor module 12.

In the music signal processor module, MSP memory stores a group of voice programs for active execution by the module. This group of voice programs utilizes the memory resources of the music signal processor 12 for instructions, delay lines, tables, coefficients and the like for active programs. The dynamic voice allocation resources in the host processor module 11 and the MSP processor module 12 provide for allocation and de-allocation of voice programs to the music signal processor module 12 in response to input signals, such as signals supplied by the keyboard 10, by the MIDI input channel 16 or by host programs.

The music signal processor module 12 may have a plurality of output channels corresponding to particular voices being executed at the same time. Each channel is updated with digital signal data at an audio rate, combined with the output of other channels, and supplied to a digital to analog converter to generate analog output sound on line 13 for supply to the speakers 14 and 15.

Each channel actively utilizes a set of instructions in the instruction memory associated with the music signal processor module for supplying the output data. When a new voice is to be allocated to one of the channels, the instructions, coefficients, tables and delay lines in the music signal processor for the selected voice must be moved into the music signal processor, and any particular voice program which is being replaced by the selected voice program must be de-allocated—delay lines cleared, coefficients overwritten, instructions masked and the like—without causing an audible glitch in the output signal. Each channel can be considered the result of a corresponding voice program. Thus, for an N channel system, N voice programs may be allocated to the group of voice programs which are actively being executed at a given time.

To dynamically allocate a voice, a voice program must be moved from host memory in the host processor module to the MSP memory in the MSP module 12 in real time, and without significant glitch in the audio output. For the purposes of this audio application, real time is considered limited by the perception of the user of the input device 10. Thus, such user must strike a key to select a voice, the selected voice must be allocated to the group of voice programs in the MSP memory, and the music signal processor must execute the voice without a perceptible delay or other distortion in the audio output.

A NOP controller 500 actively assists to dynamically transfer a voice program from the host processor module 11 to the MSP memory in the MSP module 12 in real time. The NOP controller causes instructions stored in the portion of the MSP memory allocated for replacement to be disabled from changing the contents of memory locations in the processor or managed by the processor. Host CPU 20 of host processor module 11 transfers the selected voice program from the host memory to the portion of MSP memory allocated for replacement and to which the NOP mask is applied. The other voice programs in the MSP memory are not affected by the NOP controller, and the MSP module continues to execute those voice programs. Thus, the user does not perceive any delay or distortion in the audio output.

The MSP module 12 as shown in FIG. 1 operates in a host programmed environment, with multiple signal processors performing multitimbral music synthesis. The architecture of a preferred embodiment of a signal processor for use in the system of FIG. 1 is shown in FIG. 2. The signal processor, termed MSP or music signal processor, contains specialized interfaces, including a host interface 200, a local RAM interface 201, and a high speed audio bus HSAB interface 202.

The host interface 200 supports access to all internal areas of the MSP chip, that is the host CPU 20 can read and/or write all internal configuration, status and data registers transparent to the MSP's operation. The MSP also contains a conditional interrupt and LED interface 203 which includes at least two interrupt registers identifying which of a set of 32 possible interrupts require processing.

The RAM interface 201 supports dynamic RAM of up to 16 Mega words of 24 bits. The high speed audio bus interface 202 provides 128 channels of transparent data flow among the MSPs, and allow algorithms to be spread across multiple MSPs for higher processing power.

The system includes two basic internal buses, including the X bus 204 and the Y bus 205. The primary processing resources include a 24×24 bit multiplier merged with a 56 bit accumulator (MAC 206), and an arithmetic logic unit ALU 207. The MAC 206 and ALU 207 share input latches, shifters, limiters and multiplexers which provide the inputs to the processing resources as described in more detail below.

The chip also includes two internal memory arrays referred to as the X memory 208 and the Y memory 209. X memory 208 and Y memory 209 are 256 words of 24 bits each and consist of single port static RAMs. The X memory bank is a linearly indexed register array, while the Y memory bank includes segments using linear or circular addressing schemes.

The high speed audio bus interface 202 includes a register array of 64 words of 24 bits each implemented with static RAM. The host programs the mapping registers in the highspeed audio bus interface 202 to indicate which of the 128 time slots the local MSP will utilize on the high speed audio bus 202.

The system also includes an index register 210 which provides for indirect addressing into the X and Y memory spaces and into the RAM space provided the RAM interface 201.

Other components of the MSP includes a noise generator 211 which is coupled to the X bus 204 and the Y bus 205, and S/T register 212 also coupled to the X bus 204 and Y bus 205.

A microcode store 213 readable and writable by the host across line 501, and a prefetch buffer 214 coupled to the microcode store 213 are included. The output of the prefetch buffer 214 is supplied to decoder 550. General chip clock and timing control 215 are integrated on the chip.

The data paths for MAC 206 and ALU 207 include an X input register 21 6 coupled to the X bus and a Y input register 217 coupled to the Y bus. The output of the X input register 216 and Y input register 217 are supplied to respective shifter/limiters 218, 219. The outputs of the shifter/limiters 218, 219 are supplied as inputs to 5 to 1 multiplexers 220 and 221 respectively. The other inputs to the 5 to 1 multiplexers include the value in the S register 212, the value in the T register 212, the output of the ALU 207, the output of the MAC 206. The MAC signal at the input of multiplexer 220 is supplied through shifter limiter 240. The ALU signal at the input of multiplexer 221 is supplied through shifter limiter 241. The outputs of the 5 to 1 multiplexers 220 and 221 are supplied into MAC input latches 222 and 223 respectively and directly as inputs the ALU 207. The output of the MAC input latches 222 and 223 are supplied into the MAC 206. The output of the MAC 206 is supplied to latch 224. The output of latch 224 is supplied to shifter 225 which is fed back through selector 226 to the MAC 206. The lower bits of latch 224 supplied to rounder 227. The output of the rounder 227 is coupled to the X and Y buses 204, 205, and to a comparator 228. Inputs to the comparator also include the values in the S and T registers 212.

The ALU 207, in addition to receiving the output of multiplexers 220 and 221, receives the value of the S register 212, the T register 212 and the index 210 as inputs. The ALU 207 generates an index output on line 229, and logic output on line 230, and a control output on line 231. The logic output on line 230 is supplied to latch 232, which drives the X bus on line 233 and the Y bus on line 234. The value on the X ALU output bus 233 is also supplied to the comparator 228.

The output of the comparator 228, control output on line 235 from the MAC 206, and the control output on line 231 from the ALU 207 are also supplied to the conditional interrupt and LED interface 203.

The X bus 204 and Y bus 205 carry operands among the data storage and processing blocks within the MSP. The buses are logically continuous, but there are pass transistors isolating some of the I/O functions from the main register bank, ALU, MAC buses.

Timing of the MSP and the system it operates in are derived from the sample rate of the audio outputs. The MSP is intended to operate in a system operating a 48 KHz sampling rate, providing 512 microcode steps per system cycle. Each instruction cycle can include one register access on each of the X and Y buses and either a MAC or ALU operation. The ALU and MAC are separate, and can operate on independent data. They share the X and Y buses and the input multiplexers, so that only one MAC or ALU operation may be started per instruction cycle. The microcode must coordinate data movement among the register blocks, the HSAB, RAM, etc.

The microcode decoder 550 includes a normal decode and special decode. The normal decode allows one register access on each of the X and Y buses to occur simultaneously with an ALU 207 or MAC 206 operation in one instruction cycle. The special decodes include the CONDITIONAL INTERRUPT and LED opcodes for interface 203. When a special decode instruction is executed, register accesses may not occur during the same instruction cycle because the input select field and the address fields are used for decoding the special decode instructions.

The ALU 207 can perform one calculation per instruction, and the MAC 206 can perform one calculation every two instruction cycles. Since the ALU 207 and MAC 208 both can receive inputs from themselves or each other, it is not always necessary to write the results into a register or RAM. In fact, write-back requires a separate instruction to be performed. Those instructions that result in an idle X or Y bus can be utilized by host accesses through interface 200.

The clock and timing block 215 generates clocks, generally 555, manages instruction cycles, and is responsible for generating the current microcode address, and updating it according to the current operational mode. The MSP can be halted, single stepped or allowed to free run. The host can start the MSP at any time, but execution does not actually begin until the next synchronization pulse is received through the HSAB interface.

The host processor module under normal operating (running) conditions must access the microcode store, RAM area and internal X- and Y-buses in competition with the MSP. Since RAM accesses occur over more than one MSP instruction time, and internal cycles occur in less time than one CPU cycle, the MSP must be able to determine when there is sufficient time for the host CPU to perform its access. To accomplish this, the MSP has a six-instruction prefetch queue 214. To fill this queue the host CPU must allow at least 20 microseconds between when it loads the microcode at location zero and when it sets the run/halt bit. This will allow the MSP to fill its prefetch queue with the new instructions, and be ready to begin execution on the next SYNC pulse.

The program counter (PC) of the MSP is a synchronous 9-bit counter. There are actually two counters (one 9 bits, one 8 bits). The main (9 bit) counter indicates which microcode step is actually executing. This is used for single-step triggering, and other functions which must know the exact instruction number. The second (8 bit) counter generates the addresses required for the microcode RAM to be read into the prefetch queue.

When the MSP is halted, the MSP does not perform any X or Y bus accesses, so the CPU can access the MSP's internal registers without wait-states. Before the Host sets the RUN/HALT bit, or single-steps the MSP, all host accesses should be completed i.e., if a host DMA RAM access is started, and the MSP's RUN/HALT bit is set before the access is completed, the results of the MSP's operation and the DMA operation are indeterminate.

The host interface 200 allows the host processor to read and/or modify the internal registers of the MSP including microcode store 213, and control its operation and configuration. It is the primary interface for setting the interrupt and control registers, as well using the RAM port 201, the HSAB port, and all the internal MSP registers. The host interface 200 must contend for the X and Y buses 204, 205 with the ALU 207 and other internal blocks. For this reason, the host interface 200 inserts wait states into a CPU cycle until the desired action can be accomplished. For example, a write to the X register area 208 that begins while the ALU 207 is using that area will generate host wait states until the write by the host can be accomplished.

Instructions in the prefetch buffer 214 are supplied in sequence to decoder 550 which issues control signals generally 551 throughout the chip as known in the art. The control signals 551 include a set of read enable signals 552 and write enable signals 553 which are distributed to the latches and registers in the chip and to the RAM interface 201.

A NOP controller 500 is coupled to the host interface 200. The NOP controller receives a command across line 502 from the host which indicates a subset of memory locations in the microcode store 213 to be masked. The NOP controller 500 issues a flag on line 503 to the decoder 550 which disables execution of the instructions read from the identified subset of memory locations. In a preferred system, the instructions are disabled by disabling the write enable signals on lines 553 issued by the decoder 550 to storage locations and memory arrays on the chip. Thus, the instructions identified by the command on line 502 are disabled from changing the contents of any memory location managed by the processor.

In a preferred system, the flag on line 503 is further operative to disable generation of read enable signals on lines 552 by the circuits in decoder 550. This prevents the instructions in the identified subset from causing read traffic on the XBUS and YBUS of the processor. Thus, the host is able without contention from the real time processor, to utilize the X and Y buses through the host interface block 200 (coupled to decoder as indicated by line 556) for access to the RAM through RAM interface 201, and to other memory locations managed by the chip, such as the index registers and the like. These accesses are critical to downloading parameters of a new program, such as coefficients, I/O configuration, and tables, which must be done in addition to the downloading of instructions to the instruction memory 213. Thus, the decoder includes circuits which enable configuration information stored in, or under control of, the processor can be updated by the host during the execution of the disabled instructions without contention for the X and Y buses. FIG. 3 schematically illustrates the organization of the set of memory locations in the microcode store 213. As illustrated, for example, the microcode store may include a first subset of memory locations storing a first program PRG1, a second subset of memory locations storing a second program PRG2, a third subset of memory locations storing a third program PRG3, a fourth subset of memory locations storing a fourth program PRG4, and a fifth subset of memory locations storing a fifth program PRG5. The length of the respective programs stored in the set of memory locations can vary as suits the needs of a particular set of programs being executed. It may be desirable to allocate the microcode store 213 in units having fixed boundaries. This would facilitate downloading of new programs into the microcode store. However, as illustrated in FIG. 3, the boundaries can be located at any addressable location in the microcode store in the embodiment described.

Conceptually, the microcode store 213 is addressed with an instruction pointer 300. Instruction pointer includes an address to the current instruction in the microcode store 213. In the real time processor, this instruction pointer moves sequentially along the microcode store and then loops to the beginning. In the embodiment described with respect to FIG. 2, no branching is allowed, so the instruction pointer 300 reaches each instruction in the microcode store 213 at a predictable time relative to other instructions.

In order to replace a program in the microcode store 213, the NOP controller issues a NOP flag as illustrated along column 301. The NOP controller is responsive to a NOP start value which identifies a particular location in the set of memory locations of the microcode store 213. When the instruction pointer reaches the NOP start value, the NOP flag is asserted as indicated by the ones in column 301. A NOP flag remains asserted for a "length" in the number of instructions indicated by a NOP count value stored in the NOP controller. When the count is expired, the NOP flag is turned off as indicated in column 301.

When the NOP flag is not asserted, the instructions are executed normally by the processor. When the NOP flag is asserted, the instructions are overridden by disabling the write enable signals distributed throughout the chip. This prevents the instructions from changing the values of any registers, or accessing the RAM through RAM interface 201 during assertion of the NOP flag. In addition, the read enable signals are also disabled to prevent the instructions from contending for the X and Y bus with the host processor accesses to memory locations coupled to the X and Y buses.

This gives the host system a mechanism for disabling a selected program at a predictable location, and enabling the new instructions written to that location with a predictable result. Instructions written into the microcode store in this manner do not begin to execute prematurely, for instance, if the instruction pointer happens to be located within the range of locations being replaced. After the entire new program is downloaded and other initialization functions are completed by the host, the NOP controller is signalled, and the NOP flag is released, and the next time the instruction pointer reaches the replaced segment of code, it executes normally.

The microcode store 213 and prefetch 214 are implemented with a single-port static RAM with separate I/Os. There are 512 microcode steps of 40 bits each, stored as 256 words of 80 bits. The microcode contains information about the current operation. This is prefetched three full words (six instructions) ahead and decoded by decoder 550, so the MSP can determine when an internal bus phase, or RAM access will be available for the host CPU.

The host CPU downloads microcode in full 80 bit blocks, which require five 16 bit word writes to assemble. The location where the assembled word is placed is determined by the setting of the appropriate microcode pointer register. There are two such pointers. One is used when host DMA logic is downloading microcode, and the other is used when the host CPU is accessing the microcode port directly. The microcode is stored in two instruction words to allow the host CPU access to the memory block while the MSP is operating. With this method, there is always time reserved for new microcode to be downloaded.

Microcode can be downloaded in a forward direction only. The MSP supports microcode download while the MSP is both halted and running. The NOP start and NOP count registers as described below are used when a portion of the microcode needs to be modified, and it is desired that the MSP remain operating while that code segment is replaced.

In support of the wait state generation, the decoder 550 supplies signals on line 556 to host wait state generation logic in the host CPU interface 200. These signals indicate to the host CPU interface 200 whether the next instruction to execute will be using an X or Y bus cycle.

The NOP Controller allows the host processor module to replace a portion of the microcode while the MSP is running and other code segments are executing. The location where the new microcode is placed is determined by the NOP start register which holds the address to the first location. The number of locations allocated for the new microcode is determined by the value in the NOP count register.

The host processor module issues commands to load the NOP start and NOP count registers and to initiate a microcode transfer from the host memory. The MSP will continue to execute microcode instructions until the MSP instruction counter equals the start register. This causes the contents of the NOP count register to be loaded to the NOP counter. The NOP counter is decremented every instruction cycle until it reaches zero. The NOP counter causes a NOP flag to be asserted disabling execution of the current instruction. The NOP flag is asserted to every following instruction wherever the NOP counter is a non-zero value.

The host processor module loads new microcode during the NOP cycles of the MSP. Once the new microcode is loaded, the host processor writes a zero to the NOP count register to disable the NOP function of the NOP controller and enable execution of the new code segment.

FIG. 4 is a block diagram illustrating the implementation of the NOP controller. As mentioned above, the clock and timing block 215 of the CPU includes logic which may be characterized as an instruction sequencer, generally 400. The instruction sequencer 400 includes an 8 bit prefetch counter 401 and a 9 bit program counter 402. The prefetch counter 401 supplies an address to the microcode store 213. The output of the microcode store is supplied to a six instruction prefetch queue 403. The program counter 402 is a 9 bit address pointing to the specific instruction to be decoded next. Thus, the program counter 402 is clocked by an instruction clock, the prefetch queue 403 is clocked by the same instruction clock, and the prefetch counter 401 is clocked by the instruction clock divided by 2 because each location in the microcode store includes two instructions.

The output of the prefetch queue 403 is supplied to the decoder 550. The decoder supplies control signals for distribution throughout the chip to control operations by the processor in response to specific instructions, as known in the art. The control signals include read enables on lines 552 and write enables on lines 553 as mentioned above. Also, the decoder supplies signals on lines 556 indicating to the host interface wait state generator 404 whether the next instruction will be utilizing the internal X and Y bus of the processor.

The decoder 550 also receives as input the NOP flag on line 503. The NOP flag is generated by logic based primarily on counter 405. The counter 405 has a load input on line 406 generated at the output of comparator 407. The inputs to the comparator 407 include the output of the program counter 402, and the contents of the NOP start register 408. Start register 408 is a 9 bit read/write register and contains the address of the first microcode instruction which is to be ignored and replaced by a NOP instruction. If the value in the NOP count register is equal to zero, then the NOP function is disabled and the value in this register is meaningless. This register does not produce any wait states to the CPU.

The NOP controller includes a 10 bit data input on line 409. The NOP count register 410 drives the input on line 409. Count register 410 is a 10 bit read/write register and contains the number of microcode instructions which are to be ignored and replaced by NOP instruction. If the value in this register is equal to zero, then the NOP controller is disabled. This register does not produce any wait states to the CPU.

The NOP counter 405 also includes a count enable input which is coupled to receive the NOP flag on line 503. The output of the NOP counter is supplied as an input to a zero detector 411. The output of the zero detector is the NOP flag on line 503. Thus, when the NOP flag is non-zero, the NOP counter is enabled.

In operation, when the program counter 402 issues an address which matches the value in the NOP start register 408, the NOP counter receives a load input signal on line 406. This causes the value in the NOP count register to be loaded into the NOP counter. At this point, the output of the NOP counter will be non-zero, and the NOP flag will be asserted, enabling the counter. On each instruction clock cycle, the counter will be decremented by one. When the counter is decremented by the number of instructions indicated in the NOP count register 410, its output will reach zero, and the NOP flag will be turned off. This sequence will continue as the instruction sequencer 400 loops through the address space of the microcode store 213, until disabled by writing all zeroes to the NOP count register 410.

FIG. 5 conceptually illustrates an alternative approach to the NOP controller according to the present invention. In order to replace a code segment in microcode store 613, the host processor module writes to NOP start register 604 and NOP count register 606 as above.

The MSP executes instructions from microcode store 613. Instruction sequencer 602 supplies an address to microcode store 613 through bus 501 to access an instruction. Microcode store 613 supplies an instruction from the addressed location on bus 613 to selector 615. A second input to selector 615 is NOP instruction on line 618. Selector 615 is controlled by NOP flag 623 so the instruction on bus 613 passes to decoder 650 for decoding unless NOP flag 623 is asserted. Decoder 650 asserts decoder signals on lines 651 as necessary to execute the decoded instruction.

Instructions in microcode store 613 are executed until the address applied by instruction sequencer 602 equals the address in the start register 604. Thus, instruction sequencer 602 and start register 604 are coupled to comparator 610 via lines 603 and 605, respectively. Upon a match, comparator 610 asserts a counter enable (CE) 611 to counter 620. Counter 620 determines the value contained in count register 606 through line 607. If the value in count register 606 is non-zero, counter 620 will assert NOP flag 623, causing selector 615 to mask instructions from the microcode store 613 by selecting the NOP instruction on line 618. Counter 620 decrements the contents of count register 606 at each instruction cycle until the value in count register 606 equals zero, when NOP flag 623 is turned off.

An alternative approach to replacing masked instructions with NOP instructions includes causing a branch to an "idle" loop of instructions at the start address, for a length of time equal to the count value.

Host processor module 11 loads microcode stored in the host memory to microcode store 613 through bus 652. After the loading is complete, the host processor module will write a zero to count register 606 to disable the NOP controller and enable execution of the new microcode segment in microcode store 613.

Figure 6:
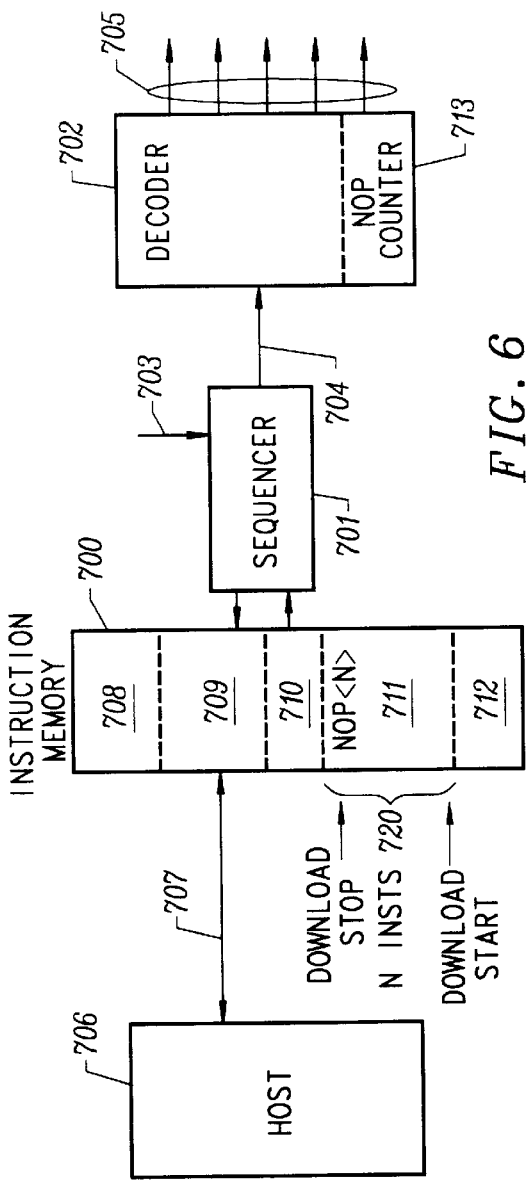
FIG. 6 illustrates an alternative approach to implementing the present invention.
Figure 7:
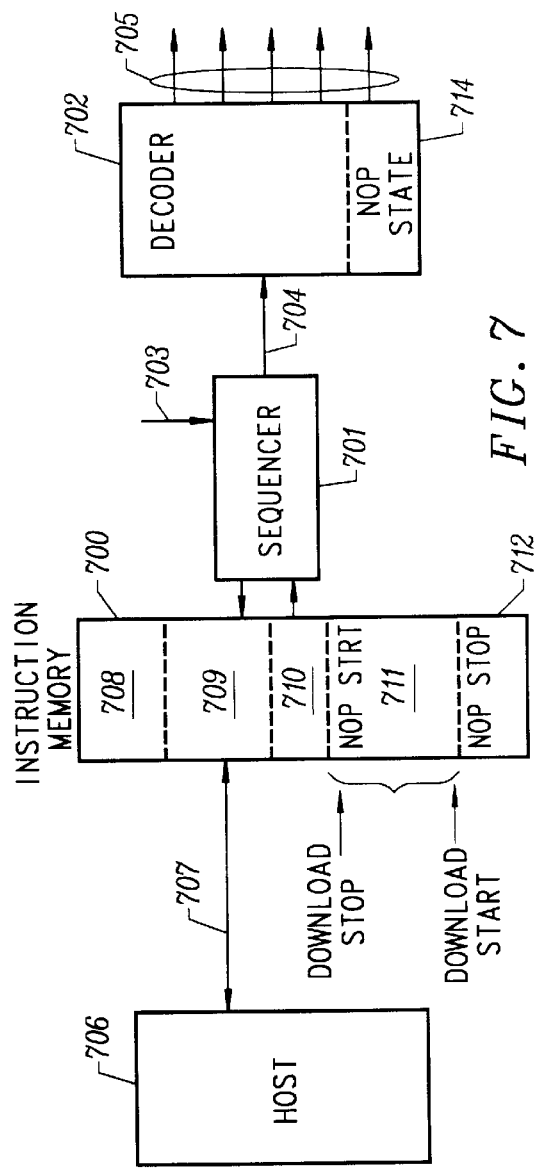
FIG. 7 illustrates yet another alternative approach to implementing the present invention.

FIGS. 6 and 7 illustrate alternative approaches to implementing the NOP controller according to the present invention. FIG. 6 illustrates a first embodiment. According to the embodiment of FIG. 6, a real time processor includes an instruction memory 700, an instruction sequencer 701, and a decoder 702. Instructions from the instruction memory 700 are addressed and retrieved by the sequencer 701 in response to control signals on line 703 generated by the real time processor. Instructions in the sequence are supplied on line 704 to the decoder 702. The decoder generates a set of control signals 705 for controlling the operations of the real time processor in response to the instructions. A host system 706 is coupled with the real time processor, and in particular across line 707 to supply instructions to the instruction memory 700 for particular programs to be executed.

As explained before, the host 706 issues a command which causes the real time processor to override execution of a subset of instructions in the instruction memory 700, wherein the subset of instructions being overridden may include a program of instructions to be replaced. Thus, in FIG. 6, the instruction memory is illustrated as partitioned to a first subset of instructions 708, a second subset of instructions 709, a third subset of instructions 710, a fourth subset of instructions 711, and fifth subset of instructions 712. In order to override a particular subset of instructions, e.g., subset 711, the host processor 706 issues a command. The command in this embodiment comprises the writing of a special instruction across line 707, referred to as the NOP<N> instruction, to the first instruction location for subset 711. The parameter N indicates the number of instructions to be overridden, and corresponds to the N instructions in the subset 711 as indicated in FIG. 6 by the bracket 720. When the NOP<N> instruction is issued to the decoder 702, a NOP counter 713 within the decoder 702 is loaded with the value N. Reads and writes are disabled by the decoder 702 as explained above for the N instructions from the subset 711.

In this embodiment, when a new program is being downloaded into the subset 711, the host processor will begin downloading from the end of the subset 711 as indicated at the download start arrow in FIG. 6. The last instruction to be written into the subset 711 will overwrite the NOP<N> instruction. Thus, when the sequencer 701 comes across subset 711 the next time, the new program of instructions is executed.

FIG. 7 illustrates yet another alternative approach. The circuitry of FIG. 7 is similar to that of FIG. 6, and is thus given like reference numbers where appropriate. In this embodiment, command issued by the host to override a subset of instructions, e.g., subset 711, comprises a pair of special instructions, referred to as NOPSTRT and NOPSTOP for NOP start and NOP stop, respectively. When the decoder 702 encounters the NOPSTRT instruction, a NOP state latch 714 within the decoder 702 is set. This latch 714 remains set until the decoder 702 encounters the NOPSTOP instruction. At that point, the NOP state latch 714 is reset. While the NOP state latch 714 is set, the decoder 702 disables reads and writes by the real time processor in response to instructions on line 704 as described above.

In the embodiment of FIG. 7, a download operation from the host 706 involves first determining the length N of the program to be replaced, and writing a NOPSTOP instruction to the next location in memory (offset N+1 from the start of the program). The next operation would be to write a NOPSTRT instruction to the first location of the subset to be replaced. The download of the new program would begin at least one location before the NOPSTOP instruction, as indicated by the download start arrow in the figure. The last instruction of the new program being downloaded would overwrite the NOPSTRT instruction. The NOPSTOP instruction could be removed from the instruction memory 700 at a later time. Alternatively, a set of NOPSTOP instructions could be distributed within the instruction memory 700 to partition it into predefined segments, which may be beneficial in some implementations.

In sum, the present invention provides technology for dynamically replacing segments of microcode in real time processors. The invention is particularly suited to dynamic allocation of voice programs in electronic based music synthesizers which require differing programmed algorithms in real time.

The foregoing description of preferred embodiments of the present invention has been provided for the purpose of illustration and description. It is not intended to be exhausted or to limit the invention to the precise forms disclosed. Obviously, many modifications and variations will be apparent to practitioners skilled in this art. The embodiments were chosen and described in this order to best explain the principles of the invention and its practical application, thereby enabling others skilled in the art to understand the invention for various embodiments with various modifications as are suited to the particular use contemplated. It is intended that the scope of the invention be defined by the following claims and their equivalence.

We claim:

1. An apparatus for replacing a segment of instructions for a processor, the processor responsive to instructions to change data, comprising:

a memory system coupled to the processor having a set of memory locations to supply a sequence of instructions stored in the set of memory locations to the processor;

a controller, coupled to the memory system and the processor, and having an input, that is responsive to a command on the input to disable the processor from changing data in response to instructions in the sequence of instructions from a particular subset of the set of memory locations which stores the segment of instructions, the particular subset including more than one memory location; and a memory interface, coupled to the memory system and to the controller, to receive and write new instructions to the particular subset to replace the segment of instructions.

2. The apparatus of claim 1, wherein the processor includes a decoder which decodes instructions in the sequence to control execution of instructions and writes of results of execution; and wherein the controller includes:

a circuit coupled to the decoder which disables writes of results of execution in response to instructions supplied by the memory system from the particular subset.

3. The apparatus of claim 2, wherein the decoder further controls reads of data by the processor in response to instructions in the sequence; and wherein the controller includes:

a circuit coupled to the decoder which disables reads of data in response to instructions supplied by the memory system from the particular subset.

4. The apparatus of claim 1, wherein the controller includes a circuit that receives the sequence of instructions, and is operative to replace instructions from the particular subset of the set of memory locations with a no-operation (NOP) instruction.

5. The apparatus of claim 1, wherein the command includes an identifier to identify the particular subset of the set of memory locations.

6. The apparatus of claim 5, wherein:

the identifier includes a start address of the particular subset in the memory and a count value designating a length of the particular subset; and the input includes a start register to hold the start address, and a count register to hold the count value.

7. The apparatus of claim 6, wherein:

the memory system includes a sequencer to supply a sequence of addresses to instructions in the set of memory locations; and the controller includes override logic coupled to the sequencer, the start register, and the count register operative to disable writes in response to instructions from the particular subset of memory locations.

8. The apparatus of claim 7, further comprising a clock generator operative to generate instruction cycles, and wherein the controller includes a counter coupled to the clock generator to count instruction cycles beginning with an instruction cycle in which the start address matches an address in the sequence of addresses.

9. The apparatus of claim 8, wherein:

the counter includes count logic which issues a NOP flag until the instructions cycles counted equals the count value; and the override logic includes circuitry responsive to the NOP flag to disable writes in response to instructions from the particular subset.

10. The apparatus of claim 1, wherein the processor includes a decoder which decodes instructions in the sequence to control execution of instructions and writes of results of execution, and the command comprises a particular instruction in the sequence; and wherein the controller includes:

a circuit coupled to the decoder responsive to the particular instruction to override instructions from the particular subset of the set of memory locations.

11. The apparatus of claim 10, wherein the particular instruction includes a parameter indicating a number of instructions in the particular subset to be overridden.

12. The apparatus of claim 1, wherein the processor includes a decoder which decodes instructions in the sequence to control execution of instructions and writes of results of execution, and the command includes a first particular instruction in the sequence indicating a beginning of the particular subset, and a second particular instruction in the sequence indicating an end of the particular subset; and wherein the decoder includes:

a circuit coupled to the decoder responsive to the first particular instruction and to the second particular instruction to override instructions from the particular subset.

13. The apparatus of claim 1, wherein the processor includes additional memory resources coupled to the memory interface, used during execution of instructions and accessible through the memory interface, and the controller includes circuits which reduce contention for such additional memory resources to improve performance of accesses to such additional memory resources through the memory interface.

14. A signal processing system comprising:

a real time processor to execute a plurality of segments of instructions;

an instruction memory coupled to the real time processor having a plurality of memory locations with respective addresses, to store the plurality of segments of instructions in respective groups of addresses and output a sequence of instructions to the real time processor in response to addresses:
  an instruction address sequencer coupled to the instruction memory operative to provide a sequence of addresses identifying the sequence of instructions in the instruction memory;
  a controller, coupled to real time processor, the instruction memory and the instruction address sequencer, operative, in response to a command, to override execution of a particular segment of instructions stored in a particular group of addresses in the instruction memory without stopping the instruction address sequencer, the particular segment including more than one instruction; and
  a host interface coupled to the instruction memory and the controller through which for receiving and writing new instructions to the instruction memory in the particular group of addresses to replace the particular segment of instructions.

15. The signal processing system of claim 14, wherein the command includes an identifier to identify the particular group of addresses.

16. The signal processing system of claim 15 wherein:
  the identifier includes a start address of the particular group of addresses in the instruction memory and a count value corresponding to a number of instructions in the group of addresses; and
  the controller includes:
    a start address register to hold the start address;
    a count register to hold the count value; and
    override logic, coupled to the start address register, sequencer, and the count register and responsive to the start address, addresses supplied by the sequencer, and the count value to override the instructions output by the instruction memory from the particular group of addresses.

17. The signal processing system of claim 16, wherein the override logic includes a comparator that generates a start signal when an address in the sequence to an instruction in the instruction memory equals the start address.

18. The signal processing system of claim 17, further comprising a clock to generate instruction cycles and wherein the override logic includes a counter, coupled to the clock and the comparator, that counts a number of instruction cycles in response to the start signal.

19. The signal processing system of claim 18, wherein:
  the counter includes count logic to issue an override signal until the number of instruction cycles counted equals the count value in the count register; and
  the override logic is responsive to the override signal.

20. The signal processing system of claim 14, wherein the real time processor includes a decoder which decodes instructions in the sequence to control execution of instructions and writes of results of execution; and wherein the controller includes:
  a circuit coupled to the decoder which disables writes of results of execution in response to instructions from the particular group of addresses.

21. The signal processing system of claim 20, wherein the decoder further controls reads of data in response to instructions in the sequence; and wherein the controller includes:
  a circuit coupled to the decoder which disables reads of data in response to instructions from the particular group of addresses.

22. The signal processing system of claim 14, wherein the controller includes a circuit that receives the sequence of instructions, and is operative to replace instructions in the sequence from the particular group of addresses with a no-operation (NOP) instruction.

23. The signal processing system of claim 14, wherein the command includes an identifier to identify the particular group of addresses.

24. The signal processing system of claim 14, wherein the real time processor includes a decoder which decodes instructions in the sequence to control execution of instructions and writes of results of execution, and the command comprises a particular instruction in the sequence; and wherein the controller includes:
  a circuit coupled to the decoder responsive to the particular instruction to override instructions from the particular group of addresses.

25. The signal processing system of claim 24, wherein the particular instruction includes a parameter indicating a number of instructions in the particular segment to be overridden.

26. The signal processing system of claim 14, wherein the real time processor includes a decoder which decodes instructions in the sequence to control execution of instructions and writes of result of execution, and the command includes a first particular instruction in the sequence indicating a beginning of the particular segment, and a second particular instruction in the sequence indicating an end of the particular segment; and wherein the decoder includes:
  a circuit coupled to the decoder responsive to the first particular instruction and to the second particular instruction to override instructions from the particular group of addresses.

27. The signal processing system of claim 14, wherein the real time processor includes additional memory resources coupled to the host interface, used during execution of instructions and accessible through the host interface, and the controller includes circuits which reduce contention for such additional memory resources to improve performance of accesses to such additional memory resources through the host interface.

28. An audio processing system comprising:
  an audio signal processor executing a plurality of audio programs, wherein the audio signal processor includes:
    an instruction memory storing instructions of the plurality of audio programs in a set of addressable memory locations;
    a sequencer, coupled to the instruction memory, which accesses the set of addressable memory locations in sequence to provide instructions for execution by the audio signal processor;
  a controller coupled to the memory to override execution of instructions supplied by the sequencer from a particular subset of the set of memory locations in the memory in response to an override command, the particular subset including a plurality of instructions; and
  a host processor, coupled to the audio signal processor, including a host memory to store additional audio programs, and operative to supply the override command and to download a replacement audio program from the host memory to the particular subset of the set of memory locations in the instruction memory.

29. The audio processing system of claim 28, wherein the audio processor includes a decoder which decodes instructions to control execution of instructions and writes of results of execution; and wherein the controller includes:
  a circuit coupled to the decoder which disables writes of results of execution in response to instructions from the particular subset of the set of addressable memory locations.

30. The audio processing system of claim 29, wherein the decoder further controls reads of data by the audio signal processor in response to instructions; and wherein the controller includes:

a circuit coupled to the decoder which disables reads of data in response to instructions from the particular subset of the set of addressable memory locations in the instruction memory.

31. The audio processing system of claim 28, wherein the override command includes an identifier to identify the particular subset of the set of memory locations in the memory storing instructions to be overridden.

32. The audio processing system of claim 31, wherein:

the audio signal processor includes a sequencer to supply addresses to the instructions memory to access instructions of the plurality of audio programs for execution; and the controller includes logic coupled to the sequencer responsive to the identifier to override instructions in the particular subset of the set of memory locations in the memory.

33. The audio processing system of claim 32, wherein:

the identifier includes a start address of the particular subset and a count value indicating a length of the particular subset in the memory; and the logic includes:

a start register to hold the start address;

a comparator coupled to the sequencer and the start register operative to provide a signal indicating when the address supplied by the sequencer equals the address of the start register;

a count register to hold the count value; and override logic coupled to the comparator and the count register responsive to the signal from the comparator and the count value to override instructions from the particular subset of the set of memory locations.

34. The audio processing system of claim 33, wherein the override logic includes a counter coupled to the comparator responsive to the signal from the comparator to count the instructions in the particular subset of the set of memory locations.

35. The audio processing system of claim 28, wherein the controller includes logic to substitute instructions output from the particular subset of the set of memory locations with no-operation instructions.

36. The audio processing system of claim 28, wherein the processor includes a decoder which decodes instructions to control execution of instructions and writes of results of execution, and the override command comprises a particular instruction in the set of addressable memory locations; and wherein the controller includes:

a circuit coupled to the decoder responsive to the particular instruction to override instructions from the particular subset.

37. The audio processing system of claim 36, wherein the particular instruction includes a parameter indicating a number of instructions in the particular subset of the set of memory locations to be overridden.

38. The audio processing system of claim 28, wherein the processor includes a decoder which decodes instructions to control execution of instructions and writes of results of execution, and the override command includes a first particular instruction in the set of addressable memory locations indicating a beginning of the particular subset, and a second particular instruction in the set indicating an end of the particular subset; and wherein the decoder includes:

a circuit coupled to the decoder responsive to the first particular instruction and to the second particular instruction to override instructions from the particular subset.

39. The audio processing system of claim 28, wherein the processor includes additional memory resources used during execution of instructions and accessible by the host processor, and the controller includes circuits which reduce contention for such additional memory resources to improve performance of accesses to such additional memory resources through the host processor.

* * * * *